US010630455B2

(12) United States Patent
Shieh et al.

(10) Patent No.: US 10,630,455 B2
(45) Date of Patent: Apr. 21, 2020

(54) METHOD AND TRANSMITTER FOR NON-ORTHOGONAL MULTIPLE ACCESS COMMUNICATION SYSTEM

(71) Applicant: Industrial Technology Research Institute, Hsinchu (TW)

(72) Inventors: Shin-Lin Shieh, Hsinchu County (TW); Yu-Chih Huang, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 73 days.

(21) Appl. No.: 15/986,834

(22) Filed: May 23, 2018

(65) Prior Publication Data
US 2019/0044687 A1  Feb. 7, 2019

Related U.S. Application Data

(60) Provisional application No. 62/541,111, filed on Aug. 4, 2017.

(30) Foreign Application Priority Data

Nov. 29, 2017  (TW) .............................. 106141701 A

(51) Int. Cl.
*H04L 5/00* (2006.01)
*H04W 52/26* (2009.01)
(Continued)

(52) U.S. Cl.
CPC .......... *H04L 5/0064* (2013.01); *H04L 1/0002* (2013.01); *H04L 1/0015* (2013.01);
(Continued)

(58) Field of Classification Search
CPC .. H04L 5/0064; H04L 1/0067; H04W 52/267; H04W 72/0493; H04W 4/70
See application file for complete search history.

(56) References Cited

U.S. PATENT DOCUMENTS 9,713,098 B2  7/2017 Kim et al.
2015/0312074 A1  10/2015 Zhu et al.
(Continued)

FOREIGN PATENT DOCUMENTS

CN  106452700  2/2017
TW  200814596  3/2008
(Continued)

OTHER PUBLICATIONS

"Search Report of Europe Counterpart Application", dated Jan. 2, 2019, p. 1-p. 10.
(Continued)

*Primary Examiner* — Melvin C Marcelo
(74) *Attorney, Agent, or Firm* — JCIPRNET

(57) ABSTRACT

A transmitting method of a transmitter for a non-orthogonal multiple access communication system, including: storing rules for calculating transmission rate combinations for simultaneously transmitting a first and a second application data; receiving a transmission grant for transmitting the first application data from a receiver; determining whether to transmit the second application data simultaneously; if yes, calculating multiple transmission rate combinations for simultaneously transmitting the first and the second application data based on the rules to calculate a transmission rate combination table, or generating the transmission rate combination table according to a pre-stored transmission rate combination table; selecting a transmission rate combination from the transmission rate combinations in the transmission rate combination table based on a transmission rate requirement of the second application data; and transmitting the first and the second application data simultaneously based on the selected transmission rate combination.

20 Claims, 5 Drawing Sheets

(51) Int. Cl.
*H04L 1/00* (2006.01)
*H04W 72/04* (2009.01)
*H04W 4/70* (2018.01)

(52) U.S. Cl.
CPC ......... *H04L 1/0067* (2013.01); *H04W 52/267* (2013.01); *H04W 72/0493* (2013.01); *H04W 4/70* (2018.02)

(56) References Cited

U.S. PATENT DOCUMENTS

| | | | |
|---|---|---|---|
| 2016/0330695 | A1 | 11/2016 | Benjebbour et al. |
| 2017/0034845 | A1 | 2/2017 | Liu et al. |
| 2017/0099098 | A1 | 4/2017 | Lin et al. |
| 2018/0124684 | A1* | 5/2018 | Kwon ................. H04W 72/044 |
| 2019/0029031 | A1* | 1/2019 | Kumar ................. H04L 5/003 |

FOREIGN PATENT DOCUMENTS

| | | |
|---|---|---|
| TW | 200908611 | 2/2009 |
| TW | 201528717 | 7/2015 |
| TW | 201620279 | 6/2016 |
| WO | 2007047746 | 4/2007 |
| WO | 2015062659 | 5/2015 |

OTHER PUBLICATIONS

Anass Benjebbour et al., "Non-orthogonal multiple access (NOMA): Concept, performance evaluation and experimental trials," 2015 International Conference on Wireless Networks and Mobile Communications (WINCOM), Oct. 20-23, 2015, pp. 1-6.
"Office Action of Taiwan Counterpart Application", dated Jul. 25, 2018, p. 1-p. 4.
Li Li, et al., "Cutoff Rate of Sparse Code Multiple Access in Downlink Broadcast Channels." IEEE Transactions on Communications, vol. 65, No. 8, Aug. 2017, pp. 3328-3342.
Ziyang Li, et al., "Joint Codebook Assignment and Power Allocation for SCMA Based on Capacity with Gaussian Input." IEEE/CIC International Conference on Communications in China (ICCC), Jul. 2016, pp. 1-6.
Jun Wang, et al., "A novel codeword grouped SCMA." IEEE 6th International Symposium on Microwave, Antenna, Propagation, and EMC Technologies (MAPE), Oct. 2015, pp. 753-758.
Donghong Cai, et al., "Multi-dimensional SCMA codebook design based on constellation rotation and interleaving." 2016 IEEE 83rd Vehicular Technology Conference (VTC Spring), May 2016, pp. 1-5.
Hosein Nikopour, et al., "SCMA for downlink multiple access of 5G wireless networks." 2014 IEEE Global Communications Conference (GLOBECOM), Dec. 2014, pp. 3940-3945.
Pablo Soldati, et al., "Optimal User Scheduling and Rate Selection for REMA Broadcast-Channel Transmission." 2016 IEEE Global Communications Conference (GLOBECOM), Dec. 2016. pp. 1-6.
Alberto G. Perotti, et al., "Non-orthogonal multiple access for degraded broadcast channels: RA-CEMA." 2015 IEEE Wireless Communications and Networking Conference (WCNC)—Track 1: PHY and Fundamentals, Mar. 2015, pp. 735-740.

* cited by examiner

METHOD AND TRANSMITTER FOR NON-ORTHOGONAL MULTIPLE ACCESS COMMUNICATION SYSTEM

CROSS-REFERENCE TO RELATED APPLICATION

This application claims the priority benefits of U.S. provisional application Ser. No. 62/541,111, filed on Aug. 4, 2017 and Taiwan application serial no. 106141701, filed on Nov. 29, 2017. The entirety of each of the above-mentioned patent applications is hereby incorporated by reference herein and made a part of this specification.

TECHNICAL FIELD

The disclosure relates to a communication method, and particularly relates to a transmitter and a transmission method for a non-orthogonal multiple access (NOMA) communication system.

BACKGROUND

As the demands for network increase, the standard for communication system is also modified. Hence, the $3^{rd}$ Generation Partnership Project (3GPP) proposed the mobile communication standard of the next generation, i.e., the $5^{th}$ generation (5G) mobile communication system. The 5G mobile communication system defines three scenarios for application of communication, including the enhanced mobile broadband (eMBB), the massive machine type communications (mMTC), and the ultra-reliable and low latency communications (URLLC), respectively.

The eMBB, mMTC, and URLLC scenarios have different requirements on the communication system. For example, the eMBB scenario is suitable for a situation with a high user density. Therefore, in response to a large number of needs for transmission rate, a communication device operated under the eMBB scenario requires a larger channel capacity to be assigned to multiple users. The mMTC scenario is suitable for a situation with high demands for machine-type communications, such as the Internet of things (IoT). While a communication device operated under the mMTC scenario is more tolerant for transmission delay, such communication device requires a capability of transmitting small packets at a high efficiency. The URLLC scenario is suitable for a situation requiring a higher reliability and a shorter transmission delay, such as controlling a drone or notifications of urgent events.

In order to meet the requirements for the 5G communication system (in terms of transmission rate and transmission delay, for example), an effective data transmission method has become an issue to work on.

SUMMARY

An embodiment of the disclosure provides a transmitter for a non-orthogonal multiple access (NOMA) communication system. The transmitter includes a storage medium and a processor. The storage medium stores a plurality of rules for calculating a plurality of transmission rate combinations for simultaneously transmitting a first application data and a second application data. The processor is coupled to the storage medium and executes the following: receiving a transmission grant for transmitting the first application data from a receiver; determining whether to transmit the second application data simultaneously; if the second application data is to be transmitted simultaneously, calculating the transmission rate combinations for simultaneously transmitting the first application data and the second application data based on the rules to calculate a transmission rate combination table, or generating the transmission rate combination table according to a pre-stored transmission rate combination table in the storage medium; choosing a selected transmission rate combination from the transmission rate combinations in the transmission rate combination table based on a transmission rate requirement of the second application data; and simultaneously transmitting the first application data and the second application data to the receiver based on the selected transmission rate combination.

An embodiment of the invention provides a transmitting method for a non-orthogonal multiple access communication system (NOMA). The method includes: storing a plurality of rules for calculating a plurality of transmission rate combinations for simultaneously transmitting a first application data and a second application data; receiving a transmission grant for transmitting the first application data from a receiver; determining whether to transmit the second application data simultaneously; if the second application data is to be transmitted simultaneously, calculating the transmission rate combinations for simultaneously transmitting the first application data and the second application data based on the rules to calculate a transmission rate combination table, or generating the transmission rate combination table according to a pre-stored transmission rate combination table; choosing a selected transmission rate combination from the transmission rate combinations in the transmission rate combination table based on a transmission rate requirement of the second application data; and simultaneously transmitting the first application data and the second application data based on the selected transmission rate combination.

Based on the embodiments of the disclosure, the transmitter according to the embodiments of the disclosure is able to simultaneously transmit the data relating to two applications under a specific circumstance and is able to choose one of the transmission rate combinations from the transmission rate combination table obtained through calculation based on the transmission rate requirements of the respective applications. Accordingly, the transmitter according to the embodiments of the disclosure is able to transmit data relating to another more urgent application without suspending the data transmission of the application currently in use.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

To cope with needs for the standards of the 5G communication system, one or some exemplary embodiments of the disclosure provide a transmitter and a transmission method for a non-orthogonal multiple access (NOMA) communication system. Compared with the known orthogonal frequency-division multiplexing (ODFM) communication system, the NOMA communication system is able to provide a power domain for multiple accesses in addition to using a bandwidth more effectively.

Figure 1:
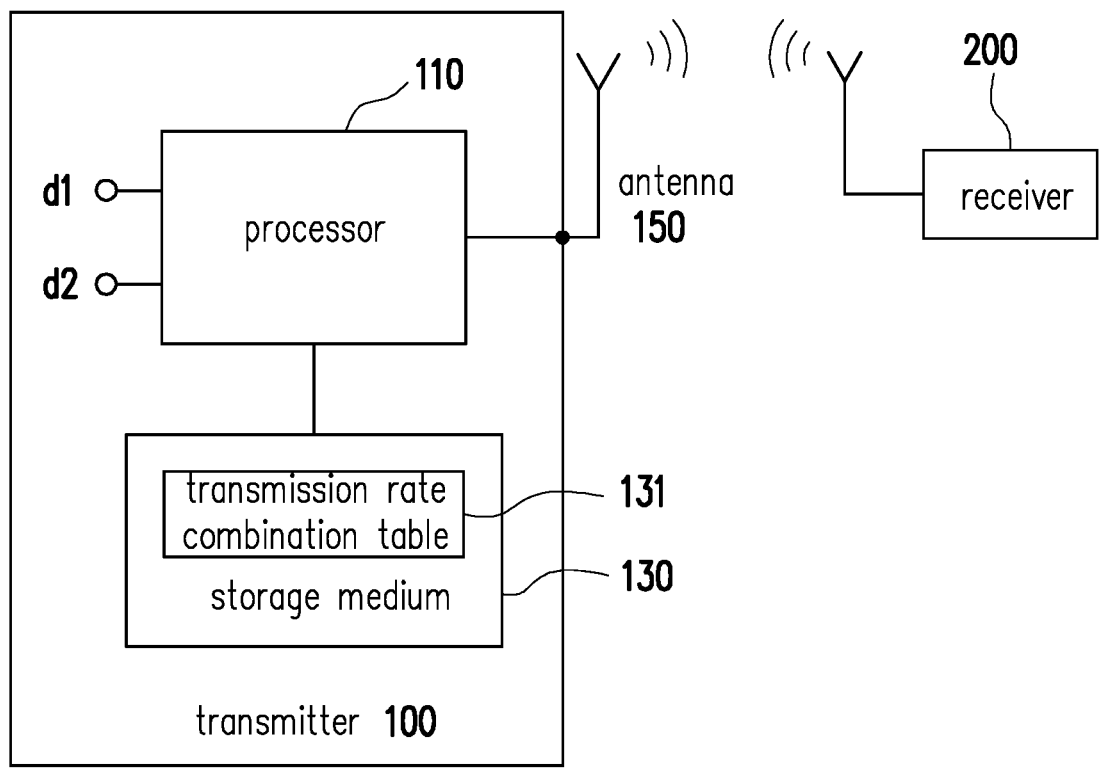
FIG. 1 is a schematic view illustrating a transmitter and a receiver according to an embodiment of the disclosure.

FIG. 1 is a schematic view illustrating a transmitter 100 and a receiver 200 according to an embodiment of the disclosure. The transmitter 100 is suitable for the NOMA communication system, and may include, but is not limited to, a processor 110, a storage medium 130, and an antenna 150. The transmitter 100 may cover a plurality of embodiments including (but are not limited to) a mobile station, an advanced mobile station (AMS), a server, a client terminal, a desktop computer, a notebook computer, a netbook, a work station, a personal digital assistant (PDA), a personal computer (PC), a scanner, a telephone device, a pager, a camera, a television, a handheld game console, a music device, a wireless sensor, and/or the like. In some applications, the transmitter 100 may be a fixed computing device operable in a mobile environment such as a bus, a train, an airplane, a ship, a car or the like. The transmitter 100 may simultaneously transmit a first application data d1 and a second application data d2 associated with two or more different applications by means of the NOMA communication technology.

The storage medium 130 may store a plurality of rules for calculating a plurality of transmission rate combinations for simultaneously transmitting the first application data d1 and the second application data d2. The storage medium 130 may be, for example, a common storage device, such as a hard drive, a static random access memory (SRAM), a dynamic random access memory (DRAM), a solid state disk (SSD), or the like. The antenna 150 may receive or transmit electromagnetic waves compatible with various wireless communication standards, such as the $5^{th}$ generation (5G) communication standard, the Wi-Fi communication standard, the long term evolution (LTE) communication standard, or the like. Nevertheless, the disclosure is not limited thereto.

The processor 110 is coupled to the storage medium 130, and may access the rules in the storage medium 130 to calculate the transmission rate combinations based on the rules to calculate a transmission rate combination table 131. In addition, the processor 110 may store the calculated transmission rate combination table 131 in the storage medium 130, and access the transmission rate combination table 131 to adjust transmission of the first application data d1 and the second application data d2. In an embodiment, instead of calculating the transmission rate combination table 131 by calculating the transmission rate combinations, the processor 110 may retrieve a predetermined transmission rate combination table stored in advance in the storage medium 130 and adopt the predetermined transmission rate combination table as the transmission rate combination table 131. Functions of the processor 110 may be implemented through a programmable device, such as a microprocessor, a microcontroller, a digital signal processor (DSP) chip, a field programmable gate array (FPGA), or the like. The functions of the processor 110 may also be implemented through an independent electronic device or integrated circuit (IC), and the functions executed through the processor 110 may also be implemented in a hardware or software form.

The transmission rate combination table 131 includes a first modulation scheme Mod 1 and a first encoding rate R1 corresponding to the first application data d1 and a second modulation scheme Mod 2 and a second encoding rate R2 corresponding to the second application data d2. Taking Table 1 as an example, Table 1 discloses the transmission rate combination table 131 having five transmission rate combinations (Index 1 to Index 5), as shown in the following.

TABLE 1

| Index | Modulation Scheme Mod1 | Modulation Scheme Mod2 | Encoding rate R1 (bits/sec) | Encoding rate R2 (bits/sec) |
|---|---|---|---|---|
| 1 |   | 8 |        | 0.6689 |
| 2 | 2 | 6 | 0.9963 | 0.6235 |
| 3 | 4 | 4 | 0.9165 | 0.5702 |
| 4 | 6 | 2 | 0.8347 | 0.5417 |
| 5 | 8 |   | 0.7823 |        |

In Table 1, the "Index" column indicates numbering of the transmission rate combinations. Values in the columns of the modulation schemes Mod 1 and Mod 2 represent the numbers of bits consumed by the adopted modulation scheme. In the embodiment, the values in the columns of the modulation schemes Mod 1 and Mod 2 represent the numbers of bits consumed in quadrature amplitude modulation (QAM). Taking a transmission rate combination 1 (i.e., the transmission rate combination represented by Index 1) as an example, a blank field in the column of Mod 1 indicates that according to the transmission rate combination 1, a transmission bandwidth assigned to the transmitter 100 is adopted to transmit the second application data d2. In other words, the transmission rate combination 1 only transmits the second application data d2 and does not transmit the first application data d1. The value "8" in the field of the column of Mod 2 indicates that the adopted modulation is a QAM consuming 8 bits, i.e., a 256-QAM modulation. Taking a transmission rate combination 2 (i.e., the transmission rate combination represented by Index 2) as an example, the value "2" in the field of the column of Mod 1 indicates that the adopted modulation is a QAM consuming 2 bits, i.e., a 4-QAM modulation, and the value "6" in the field of the column of Mod 2 indicates that the adopted modulation is a QAM consuming 6 bits, i.e., a 64-QAM modulation. Taking a transmission rate combination 5 as an example, a blank field in the column of Mod 2 indicates that in the transmission rate combination 5, the transmission bandwidth assigned to the transmitter 100 is adopted to transmit the first application data d1. In other words, the transmission rate combination 5 only transmits the first application data d1 and does not transmit the second application data d2.

Besides, values in the columns of the first encoding rate R1 and the second encoding rate R2 respectively indicate encoding rates for the first application data d1 and the second application data d2. Taking the field of the second encoding rate R2 for the first transmission rate combination 1, a value "0.6689" in the field indicates that the transmitter 100 may perform channel encoding on the second application data d2 at an encoding rate of "0.6689".

The indices (or the number of transmission rate combinations), the modulation scheme Mod 1, and the modulation scheme Mod 2 of the transmission rate combination table 131 may be set in advance by the transmitter 100 and any receiver 200 (assumed to be a base station) corresponding to the transmitter 100. The first encoding rate R1 and the second encoding rate R2 may be obtained through calculation of the processor 110. For example, the receiver 200 and the transmitter 100 may stipulate in advance to use five transmission rate combinations as well as the first modulation scheme Mod 1 and second modulation scheme Mod 2 corresponding to the respective transmission rate combinations. When the transmitter 100 receives configuration information transmitted by the base station through the antenna 150, the processor 110 may calculate the first encoding rates R1 and the second encoding rates R2 corresponding to the respective transmission rate combinations based on the known indices, the modulation schemes Mod 1 and Mod 2, a total encoding rate, and a power ratio, so as to calculate the transmission rate combination table 131.

Specifically, the transmitter 100 may receive the configuration information (e.g., an uplink grant) transmitted by the receiver 200, for example, through the antenna 150. The processor 110 may calculate the total encoding rate from the configuration information based on the Shannon theory. A formula of calculation is provided in the following:

$$R = \frac{1}{2}\log_2\left(1 + \frac{P}{N_0}\right), \quad (1)$$

In Formula (1), R represents the total encoding rate (bits/sec), P represents the total power available for the transmitter 100, $N_0$ represents an averaged power of noise, and P/No represents a signal-to-noise ratio (SNR). In addition, the processor 110 may further obtain power ratios corresponding to the respective transmission rate combinations in the transmission rate combination table 131 based on the configuration information. The processor 110 may calculate the first encoding rate $R_1$ and the second encoding rate $R_2$ corresponding to the respective transmission rate combinations based on the total encoding rate and the power ratios of the respective transmission rate combinations. Formulae for such calculation are provided in the following:

$$R_1 \le \frac{1}{2}\log_2(1 + \alpha \cdot SNR_1) \quad (2)$$

$$R_2 \le \frac{1}{2}\log_2\left(1 + \frac{(1-\alpha)SNR_2}{(1+\alpha)SNR_1}\right) \quad (3)$$

In the formulae (2) and (3), a represents the power ratios adopted for transmitting the first application data d1 and the second application data d2, and the value of $\alpha$ ranges between 0 to 1. $SNR_1$ represents a lowest value meeting a bit error rate (BER) requirement of the first application data d1 and may be represented as $SNR_1 = P_1/N_0$, wherein $P_1$ is a carrier power of the first application data d1. $SNR_2$ represents a lowest value meeting a bit error rate (BER) requirement of the second application data d2 and may be represented as $SNR_2 = P_2/N_0$, wherein $P_2$ is a carrier power of the second application data d2, and $P_1 + P_2 = P$.

For example, when the first application data d1 and the second application data d2 have the same BER requirements (e.g., the BERs of the first application data d1 and the second application data d2 need to be less than 1e−3), $SNR_1$ is equal to $SNR_2$ (i.e., $P_1$ is equal to $P_2$). When the BER requirement of the second application data d2 is stricter, namely when the BER of the second application data d2 needs to be lower than the BER of the first application data d1 (e.g., the BER of the first application data d1 needs to be lower than 1 e−3, and the BER of the second application data d2 needs to be lower than 1e−5), $SNR_1$ is less than $SNR_2$ (i.e., $P_1$ is less than $P_2$).

The power ratio $\alpha$ may be set based on transmission requirements of the first application data d1 and the second application data d2. Taking Table 1 as an example, the transmission rate combination 1 of Table 1 only transmits the second application data d2 and does not transmit the first application data d1. Thus, the power ratio $\alpha$ of the transmission rate combination 1 may be set at 0. Hence, the second encoding rate R2 of the second application data d2 may be maximized, and no available encoding rate is assigned to the first application data d1. Taking the transmission rate combination 5 in Table 1 as another example, the transmission rate combination 5 only transmits the first application data d1 and does not transmit the second application data d2. Thus, the power ratio $\alpha$ of the transmission rate combination 5 may be set at 1. Hence, the first encoding rate R1 of the first application data d1 may be maximized, and no available encoding rate is assigned to the second application data d2. The power ratios $\alpha$ corresponding to the respective transmission rate combinations may be set by the user based on the needs. The disclosure does not intend to impose a limitation on this regard.

In an embodiment, if the transmitter 100 only needs to transmit the first application data d1, the processor 110 may choose an initial transmission rate combination (e.g., the transmission rate combination 5 of Table 1) from the transmission rate combination table 131 and transmit the first application data d1 based on the initial transmission rate combination, where all the encoding rate available is assigned to the first application data d1.

In another embodiment, if the transmitter 100 needs to transmit the second application data d2 under an URLLC scenario requiring a higher reliability, for example, the processor 110 may choose a transmission rate combination from the transmission rate combination table 131 based on the transmission rate requirement of the second application data d2. For example, the processor 110 may determine that the transmission rate requirement of the second application data d2 is 2 bits/sec based on information such as an amount of data and/or a priority level of the second application data d2, for example. After determining the transmission rate requirement of the second application data d2, the processor 110 may calculate transmission rates corresponding to the respective transmission rate combinations in the transmission rate combination tables 131 based on a formula "bit number×encoding rate=transmission rate". Accordingly, the processor 110 may calculate transmission rates of the second application data d2 corresponding to the transmission rate combinations 1 to 5 in Table 1, which are respectively 5.35(8×0.6689=5.35) bits/sec, 3.74(6×0.6235=3.74) bits/sec, 2.28 (4×0.5702=2.28) bits sec., 1.08 (2×0.5417=1.08) bits/sec, and 0 bits/sec. According to the calculation results, the processor 110 may choose the transmission rate combination 3 whose transmission rate is closest to the transmission rate requirement of the second application data (i.e., the transmission rate greater than or equal to 2 bits/sec) to simultaneously transmit the first application data d1 and the second application data d2. Accordingly, a transmission rate available for the first application data d1 may be maximized when the transmission rate requirement of the second application data d2 is satisfied.

After choosing the selected transmission rate combination, the processor 110 may transmit the first application data d1 and the second application data d2 based on the selected transmission rate combination (i.e., the transmission rate combination 3). The processor 110 may perform channel encoding on the first application data d1 at an encoding rate of 0.9165 bits/sec and perform channel encoding on the second application data d2 at an encoding rate of 0.5702 bits/sec. In addition, the processor 110 may modulate the first application data d1 by a 16-QAM modulation scheme (i.e., a QAM modulation using four bits) and modulate the second application data d2 by a 16-QAM modulation scheme.

Figure 2:
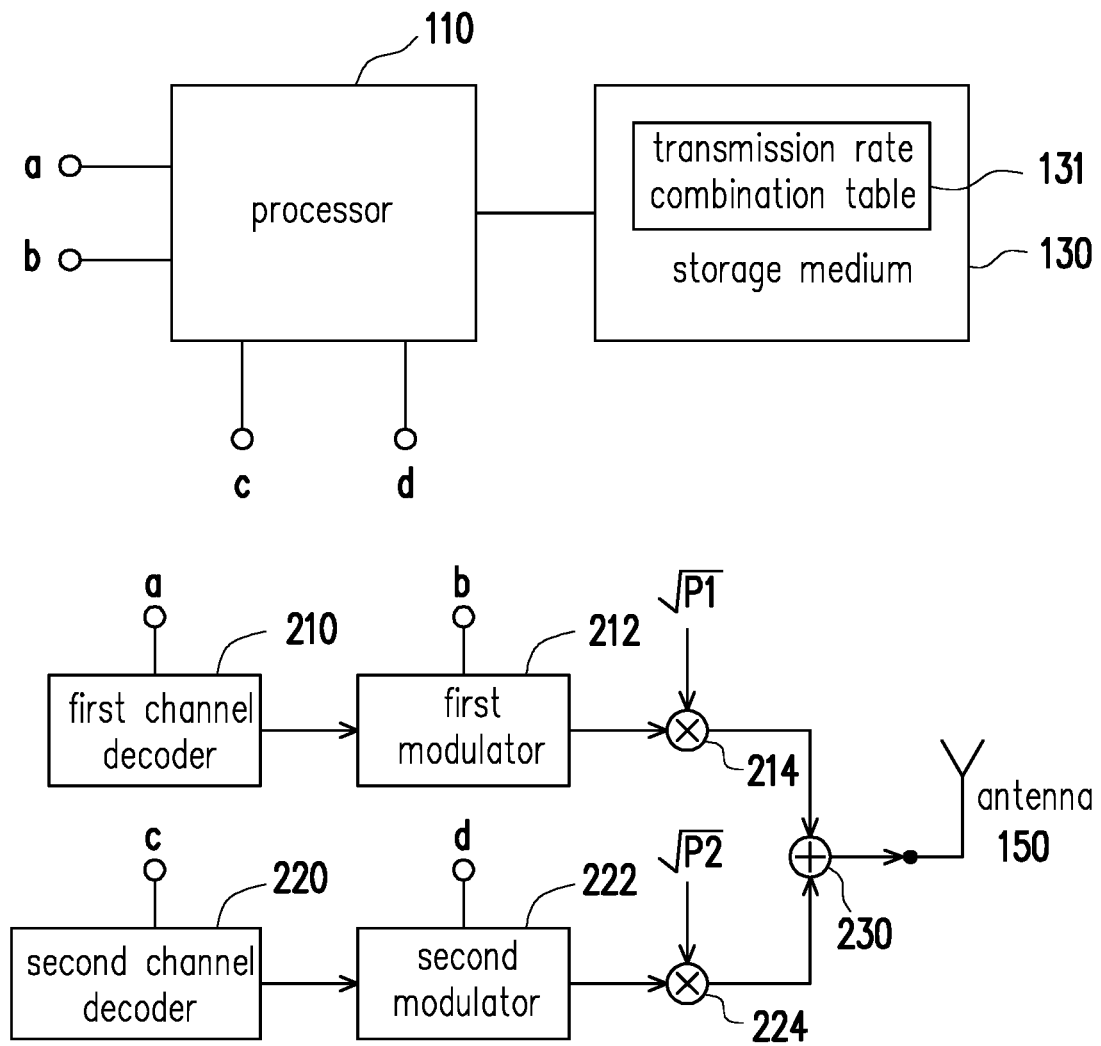
FIG. 2 is a schematic view illustrating the transmitter of FIG. 1 in greater detail.

FIG. 2 is a schematic view illustrating the transmitter 100 of FIG. 1 in greater detail. In FIG. 2, structures and functions of the processor 110, the storage medium 130, and the antenna 150 are the same as the illustration and descriptions of FIG. 1, so details in this regard will not be repeated in the following. Referring to FIG. 1, the transmitter 100 further includes a first channel encoder 210, a first modulator 212, a multiplier 214, a second channel encoder 220, a second modulator 220, a multiplier 224, and an adder 230.

The first channel encoder 210 is coupled to the processor 110 and may receive the first application data d1. Based on the selected transmission rate combination currently selected, the processor 110 may control the first channel encoder 210 to perform channel encoding on the first application data d1. For example, when the processor 110 chooses the transmission rate combination 3 in Table 1 as the selected transmission rate combination, the processor 110 may transmit a signal to control the first channel encoder 210 to perform channel encoding on the first application data d1 at the first encoding rate R1 (i.e., 0.9165 bits/sec).

The first modulator 212 is coupled to the processor 110 and the first channel encoder 210. Based on the selected transmission rate combination currently selected, the processor 110 may control the first modulator 212 to perform modulation on the first application data d1 encoded by the first channel encoder 210. For example, when the processor 110 chooses the transmission rate combination 3 in Table 1 as the selected transmission rate combination, the processor 110 may transmit a signal to control the first modulator 212 to modulate the first application data d1 by 16-QAM.

The second channel encoder 220 is coupled to the processor 110 and may receive the second application data d2. Based on the selected transmission rate combination currently selected, the processor 110 may control the second channel encoder 220 to perform channel encoding on the second application data d2. For example, when the processor 110 chooses the transmission rate combination 3 in Table 1 as the selected transmission rate combination, the processor 110 may transmit a signal to control the second channel encoder 220 to perform channel encoding on the second application data d2 at the second encoding rate $R_2$ (i.e., 0.5702 bits/sec).

The second modulator 222 is coupled to the processor 110 and the second channel encoder 220. Based on the selected transmission rate combination currently selected, the processor 110 may control the second modulator 222 to perform modulation on the second application data d2 encoded by the second channel encoder 220. For example, when the processor 110 chooses the transmission rate combination 3 in Table 1 as the selected transmission rate combination, the processor 110 may transmit a signal to control the second modulator 222 to modulate the second application data d2 by 16-QAM.

When the channel encoding and the modulation on the first application data d1 and the second application data d2 are completed, the transmitter 100 may assign the carrier power P1 and the carrier power P2 to the first application data d1 and the second application data d2 respectively through the multiplier 214 and the multiplier 224. Then, the first application data d1 and the second application data d2 undergoing the channel encoding and modulation are added to the same signal and transmitted by the antenna 150.

In an embodiment, due to reasons such as reliability, the transmitters 100 sharing the same transmission rate combination table 131 and the corresponding receivers may also adjust the calculation results of the first encoding rate R1 and the second encoding rate R2 to generate a new transmission rate combination table. Specifically, the transmitter 100 may receive the configuration information (e.g., an uplink grant) transmitted by the receiver 200 (e.g. a base station), for example, through the antenna 150, and the configuration information further includes a backoff instruction. After the processor calculates the first encoding rates R1 and the second encoding rates R2 corresponding to the respective transmission rate combinations based on the known indices, the modulation schemes Mod 1 and Mod 2, the total encoding rate, and the power ratio, the processor 110 may further adjust (lower) the first encoding rates R1 and the second encoding rates R2 calculated by the processor 110 based on the backoff instruction. Accordingly, the transmitter 100 may transmit the first application data d1 and the second application data d2 at transmission rates lower than theoretical values, so as to reduce the BER during transmission.

In an embodiment, the backoff instruction, for example, includes an instruction of subtracting predetermined amounts (e.g. a first differential value and a second differential value) respectively from the first encoding rate R1 and the second encoding rate R2 respectively, such as subtracting 0.3 bits from the first encoding rate R1 and subtracting 0.5 bits from the second encoding rate R2. In another embodiment, the backoff instruction, for example, includes an instruction of multiplying the first encoding rate R1 and the second encoding rate R2 by predetermined ratios, such as multiplying the first encoding rate R1 by 0.9 and multiplying the second encoding rate R2 by 0.8. Accordingly, the BER during transmission may be reduced.

In an embodiment, the transmitter 100 may further calculate different transmission combination tables based on different configuration information. Taking Table 2 as an example, Table 2 discloses a transmission rate combination table having three transmission rate combinations (Index 1 to Index 3), as shown in the following.

TABLE 2

| Index | Modulation Scheme Mod1 | Modulation Scheme Mod2 | Encoding rate R1 (bits/sec) | Encoding rate R2 (bit/sec) |
| --- | --- | --- | --- | --- |
| 1 | | 8 | | 0.6689 |
| 2 | 4 | 4 | 0.9165 | 0.5702 |
| 3 | 8 | | 0.7823 | |

Specifically, the transmitter 100 may receive the configuration information (e.g., an uplink grant) transmitted by the receiver 200, for example, through the antenna 150. The processor 110 may retrieve information about the total encoding rate and a transmission rate combination table size from the configuration information. Firstly, the processor 110 may determine a size of the transmission rate combination table to be calculated based on the transmission rate combination table size. For example, when the transmission rate combination table size is "5", the processor 110 may calculate the transmission rate combination table 131 having five transmission rate combinations (e.g., Table 1), and calculate the first encoding rates R1 and the second encoding rates R2 of the transmission rate combination table 131 based on the total encoding rate. Then, the transmitter 100 and the receiver 200 transmitting the configuration information may communicate based on the transmission rate combination table 131. Alternatively, when the transmission rate combination table size is "3", the processor 110 may calculate the transmission rate combination table 131 having three transmission rate combinations (e.g., Table 2), and calculate the first encoding rates R1 and the second encoding rates R2 of the transmission rate combination table 131 based on the total encoding rate. Then, the transmitter 100 and the receiver 200 transmitting the configuration information may communicate based on the transmission rate combination table 131.

In an embodiment, the transmitter 100 may further choose a subset of the currently used transmission rate combination table as a new transmission rate combination table based on a combination table subset index.

Specifically, in a case where the transmitter 100 currently communicates with the receiver 200 through the transmission rate combination table 131 with the transmission rate combination table size of "5" stipulated with the receiver 200, the transmitter 100 may receive the configuration information (e.g., an uplink grant) transmitted by the receiver 200, for example, through the antenna 150, and the processor 110 may obtain information about the combination table subset index from the configuration information. Then, the processor may choose a subset of the transmission rate combination table 131 as the new transmission rate combination table based on the combination table subset index, so as to communicate with the receiver 200 through the new transmission rate combination table. For example, when a value of the combination table subset index is "0", the processor 110 may choose a subset (e.g., Table 2) of the transmission rate combination table 131 as the new transmission rate combination table 131 based on the value "0" of the combination table subset index. Then, the transmitter 100 may communicate with the receiver 200 through the new transmission rate combination table 131.

In an embodiment, the processor 110 of the transmitter 100 may further calculate the transmission rate combination table based on a type of the corresponding receiver 200. When the type of the receiver 200 corresponding to the transmitter 100 is a successive interference cancellation (SIC) receiver, the first application data d1 and the second application data d2 may have higher transmission rates. The SIC receiver mainly adopts a value of the power domain as basis for decoding. Therefore, the transmission rate of data having a lower carrier power may be more susceptible to influences of whether the receiver 200 is an SIC receiver. In an embodiment, the first application data d1 suitable for the eMBB scenario is usually assigned the higher carrier power P1, and the second application data d2 suitable for the URLLC scenario is usually assigned the lower carrier power P2. Therefore, the second encoding rate R2 (or transmission rate) of the second application data d2 having the lower carrier power P2 is more susceptible to the influences of the type of the receiver 200. If the type of the receiver 200 is an SIC receiver, the second encoding rate R2 may be increased significantly, as shown in Table 3 below:

TABLE 3

| Index | Modulation Scheme Mod1 | Modulation Scheme Mod2 | Encoding rate R1 (bits/sec) | Encoding rate R2 (bit/sec) | SIC receiver |
| --- | --- | --- | --- | --- | --- |
| 1 | 1 | 3 | 0.9963 | 2.188 | Yes |
| 2 | 1 | 3 | 0.9963 | 2.188 | No |
| 3 | 2 | 2 | 1.833 | 1.334 | Yes |
| 4 | 2 | 2 | 1.833 | 1.168 | No |
| 5 | 3 | 1 | 2.504 | 0.6336 | Yes |
| 6 | 3 | 1 | 2.504 | 0.2391 | No |
| 7 | 0 | 4 | 0 | 3.129 | No |
| 8 | 4 | 0 | 3.129 | 0 | No |

Figure 3:
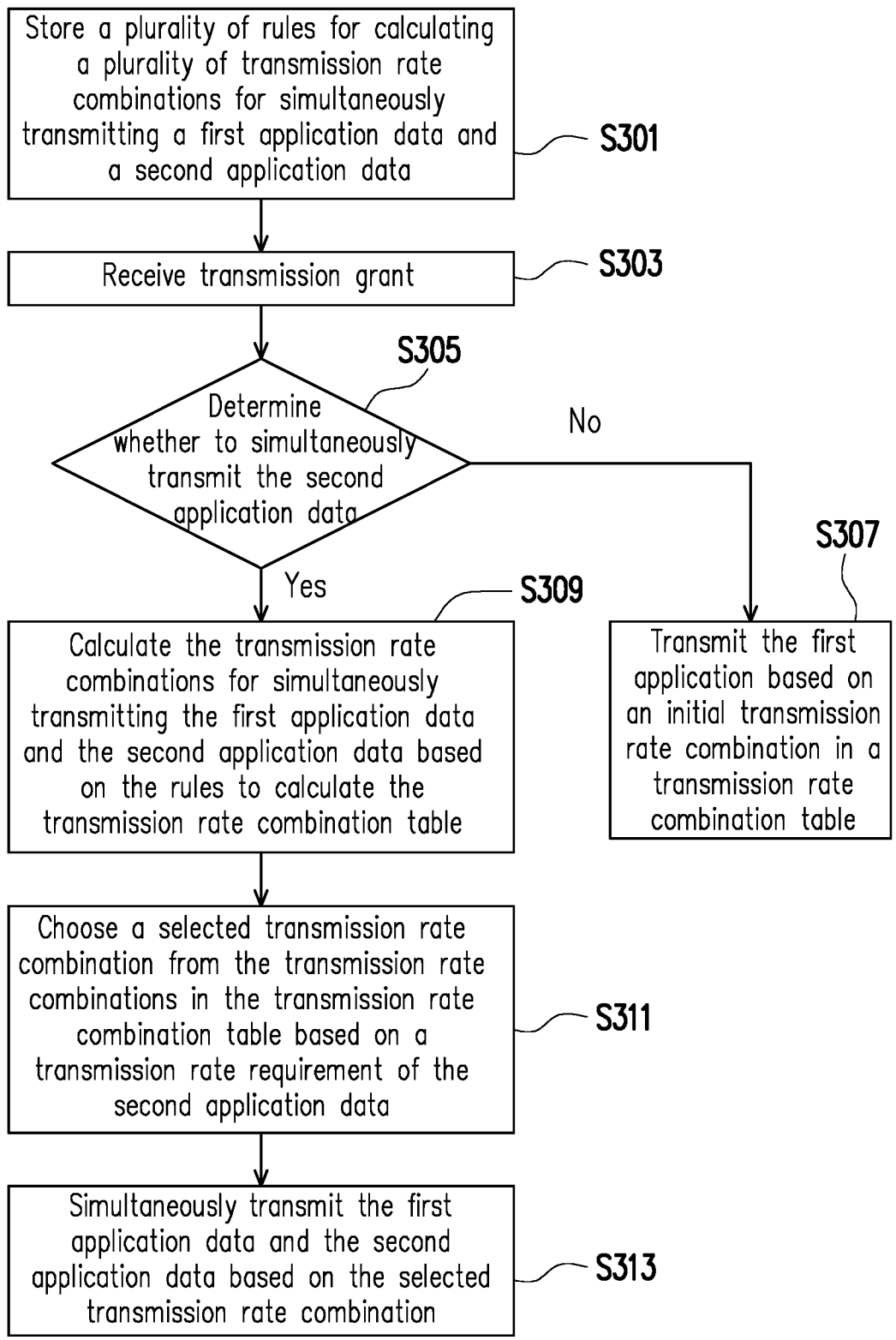
FIG. 3 is a flowchart illustrating a data transmission method according to an embodiment of the disclosure.

FIG. 3 is a flowchart illustrating a data transmission method 300 according to an embodiment of the disclosure. The data transmission method 300 may be implemented with the transmitter 100 disclosed in FIGS. 1 and 2. At Step S301, the storage medium 130 may store the rules for calculating the transmission rate combinations for simultaneously transmitting the first application data d1 and the second application data d2. At Step S303, the processor 110 may receive a transmission grant through the antenna 150, and the transmission grant may be transmitted by the receiver 200 corresponding to the transmitter 100. At Step S305, the processor 110 may determine whether to simultaneously transmit the second application data d2. Step S309 is carried out if the second application data d2 is to be transmitted. If the second application data d2 is not transmitted, Step S307 is carried out. At Step S307, the processor 110 may transmit the first application data d1 based on the initial transmission rate combination in the transmission rate combination table 131. The initial transmission rate combination is a transmission rate combination assigning all the encoding rate available to the first application data d1. At Step S309, the processor 110 may calculate the transmission rate combinations for simultaneously transmitting the first application data d1 and the second application data d2 based on the rules stored in advance to calculate the transmission rate combination table 131. At Step S311, the processor 110 may choose the selected transmission rate combination (e.g., the transmission rate combination 3 in Table 1) from the transmission rate combinations in the transmission rate combination table 131 based on the transmission rate requirement of the second application data d2. At Step S313, the processor 110 may simultaneously transmit the first application data d1 and the second application data d2 to the receiver 200 corresponding to the transmitter 100 based on the selected transmission rate combination.

Figure 4:
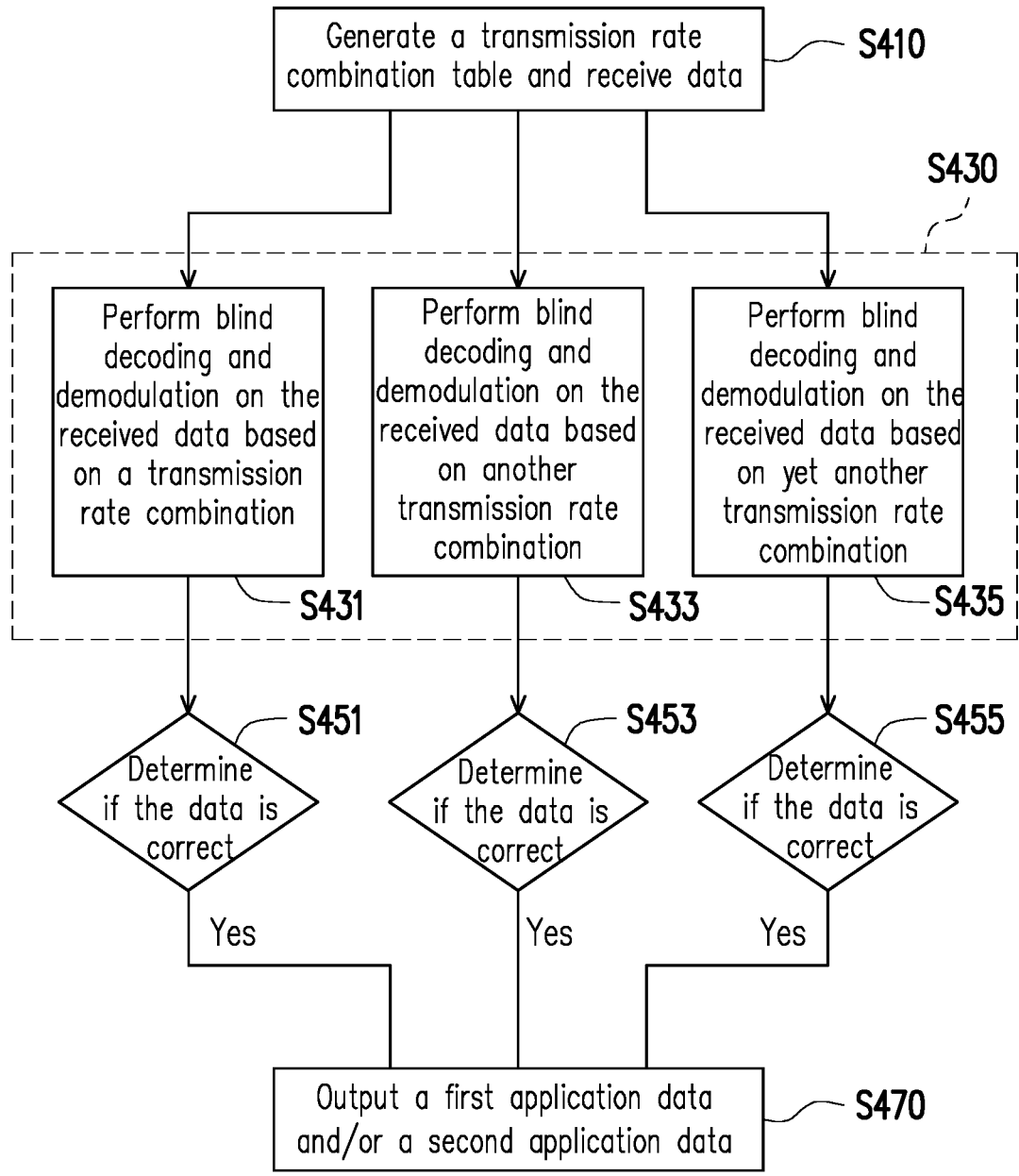
FIG. 4 is a flowchart illustrating a data receiving method according to an embodiment of the disclosure.

FIG. 4 is a flowchart illustrating a data receiving method 400 according to an embodiment of the disclosure. The data receiving method 400 may be implemented with a receiver 200 sharing the same rules for calculating the transmission rate combinations with the transmitter 100. Since the transmitter 100 calculates the transmission rate combinations based on the rules stipulated with the receiver 200 in advance to generate the transmission rate combination table 131, the receiver 200 adopting the same rules may also calculate the transmission rate combination table 131 same as that of the transmitter 100. At Step S410, the receiver 200 may receive data from the transmitter 100 and calculate the transmission rate combination table 131. At Step S430, the receiver 200 may perform blind decoding and demodulation on the received data based on all the transmission rate combinations in the transmission rate combination table

131. For example, in a case where the transmission rate combination table 131 currently used is as shown in Table 2 and has three transmission rate combinations, Step S430 may be divided into Steps S431, S433, and S435 carried out simultaneously to perform blind decoding on the received data based on three transmission rate combinations. At Step S431, blind decoding and demodulation are performed on the received data based on the transmission rate combination 1 set in Table 2 to restore the first application data d1 and/or the second application data d2. Then, at Step S451, whether the restored first application data d1 and/or second application data d2 is correct is determined. If contents of the restored first application data d1 and/or second application data d2 are correct, the restored first application data d1 and/or second application data d2 is output at Step S470. If the contents are incorrect, it is indicated that the transmitter 100 does not carry out transmission based on parameters of the transmission rate combination 1.

Similarly, At Step S433, blind decoding and demodulation are performed on the received data based on the transmission rate combination 2 set in Table 2 to restore the first application data d1 and/or the second application data d2. Then, at Step S453, whether the restored first application data d1 and/or second application data d2 is correct is determined. If contents of the restored first application data d1 and/or second application data d2 are correct, the restored first application data d1 and/or second application data d2 is output at Step S470. If the contents are incorrect, it is indicated that the transmitter 100 does not carry out transmission based on parameters of the transmission rate combination 2. Similarly, At Step S435, blind decoding and demodulation are performed on the received data based on the transmission rate combination 3 set in Table 2 to restore the first application data d1 and/or the second application data d2. Then, at Step S455, whether the restored first application data d1 and/or second application data d2 is correct is determined. If contents of the restored first application data d1 and/or second application data d2 are correct, the restored first application data d1 and/or second application data d2 is output at Step S470. If the contents are incorrect, it is indicated that the transmitter 100 does not carry out transmission based on parameters of the transmission rate combination 3. Based on the above, in the receiving method 400, blind decoding and demodulation may be simultaneously performed based on the transmission rate combinations in the transmission rate combination table 131. Accordingly, the speed and the efficiency of blind decoding and demodulation are facilitated.

Figure 5:
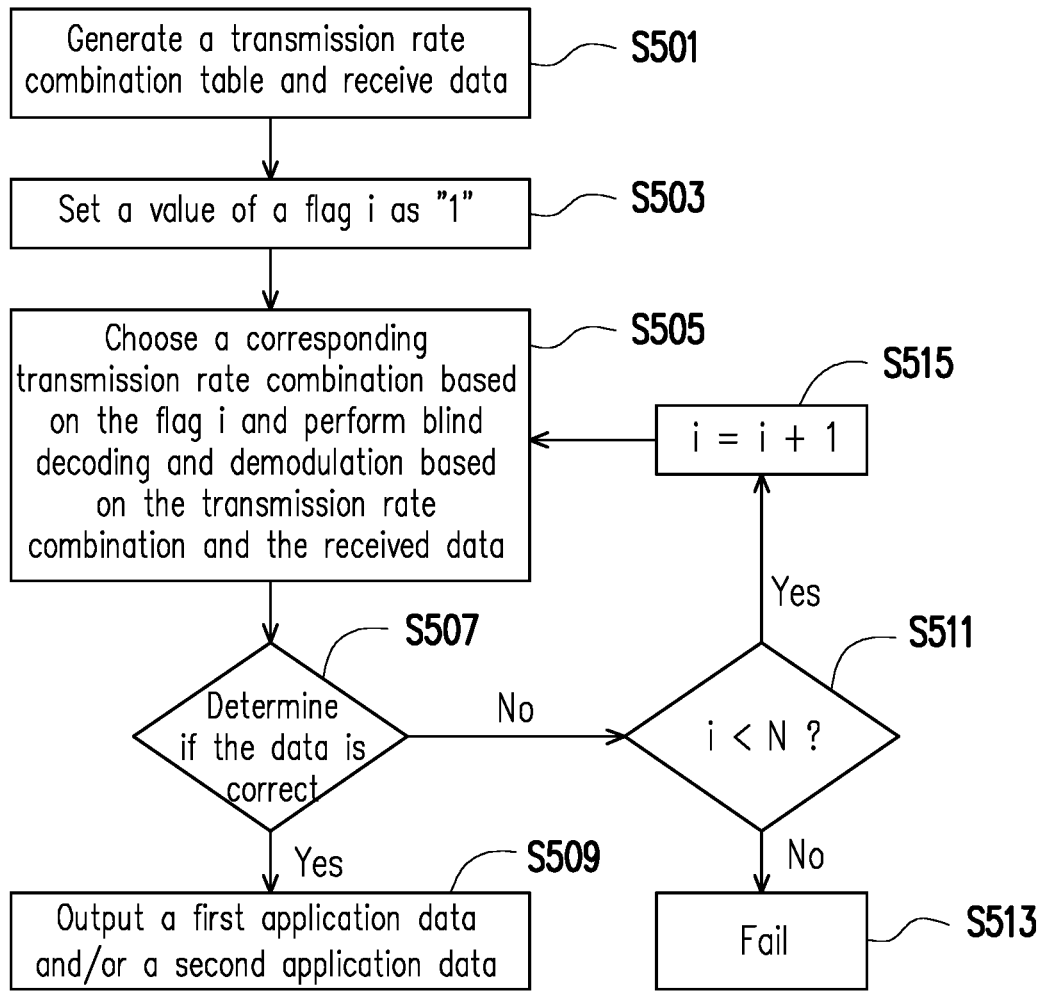
FIG. 5 is a flowchart illustrating a data receiving method according to an embodiment of the disclosure.

FIG. 5 is a flowchart illustrating a data receiving method 500 according to an embodiment of the disclosure. What differs from the data receiving method 400 of FIG. 4 is that, in the receiving method 500, decoding and demodulation on the received data are sequentially carried out based on the respective transmission rate combinations in the transmission rate combination table 131. Specifically, at Step S501, the receiver 200 may receive data from the transmitter 100 and calculate the transmission rate combination table 131. At Step S503, the receiver 200 may set a value of a flag i as "1", and the flag i represents the index in the transmission rate combination table 131. For example, when the value of the flag i is "1", the transmission rate combination 1 in the transmission rate combination table 131 is selected. When the value of the flag i is "2", the transmission rate combination 2 in the transmission rate combination table 131 is selected. At Step S505, the transmission rate combination 1 corresponding to the value "1" of the flag i may be selected from the transmission rate combination table 131 based on the flag i, and blind decoding and demodulation may be performed on the received data based on the transmission rate combination 1 to restore the first application data d1 and/or the second application data d2. At Step S507, whether the restored first application data d1 and/or second application data d2 is correct is determined. If contents of the restored first application data d1 and/or second application data d2 is correct, the restored first application data d1 and/or second application data d2 is output at Step S509. If the contents are incorrect, it is indicated that the transmitter 100 does not carry out transmission based on parameters of the transmission rate combination 1 corresponding to the current flag i. At Step S511, whether the value of the flag i exceeds the number N of the transmission rate combinations of the transmission rate combination table 131. Taking Table 1 as an example, Table 1 has a total of five transmission rate combinations. Thus, if it is determined that the value of the flag i exceeds 5, there is no corresponding transmission rate combination available for the receiver 200 to perform blind decoding and demodulation. In such case, Step S513 is performed to declare that restoring of the first application data d1 and/or second application data d2 fails. If it is determined that the value of the flag i does not exceed the number N of the transmission rate combinations of the transmission rate combination table 131, Step S515 is carried out to add 1 to the value of the flag i. In an example where Table 1 is adopted as the transmission rate combination table 131, if the value of the current flag i is "1", it is determined at Step 511 that the value "1" of the flag i does not exceed "5". Therefore, 1 may be added to the value of the flag i at Step 515 to turn the value of the flag i into "2". After Step S515, Step 505 may be performed again to choose the transmission rate combination (e.g., the transmission rate combination 2 corresponding to the value "2" of the flag i) based on the new flag (e.g., the flag i whose value is "2") and subsequently perform blind decoding and demodulation.

In view of the foregoing, the transmitter according to the embodiments of the disclosure is able to generate the transmission rate combination table same as that of the receiver based on the rules for calculating the transmission rate combinations stipulated by the transmitter and the receiver when the transmitter receives a data transmission request of another application (e.g., a second application) after receiving the uplink grant for the first application data, so as to carry out data transmission based on the NOMA technology. Accordingly, the transmitter according to the embodiments of the disclosure is able to transmit the second application data without suspending the transmission of the first application data, so as to meet a transmission rate requirement of low latency for urgent data or facilitate a channel capacity. Besides, the transmitter may also receive the configuration information transmitted by the receiver (e.g., a base station) and choose a subset of the transmission rate combination table as the new transmission rate combination table based on the configuration information, so as to reduce the complexity of blind decoding performed on the data by the receiver. Moreover, the transmitter may also receive the backoff instruction transmitted by the receiver, for example, and lower the values of the first encoding rate and the second encoding rate originally calculated based on the backoff instruction. Accordingly, the transmitter may transmit the first application data and the second application data at rates lower than the rates in the transmission rate combination table to facilitate the transmission reliability.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A transmitter of a user equipment (UE) for a non-orthogonal multiple access (NOMA) communication system, the transmitter comprising:
a storage medium, storing a plurality of rules for calculating a plurality of transmission rate combinations for simultaneously transmitting a first application data and a second application data, wherein the plurality of rules are associated with a total encoding rate, a power ratio of a transmission power corresponding to the first application data to a transmission power corresponding to the second application data, a modulation scheme for the first application data, and a modulation scheme for the second application data;
a processor, coupled to the storage medium and executing the following:
receiving a transmission grant for transmitting the first application data from a receiver;
determining whether to transmit the second application data simultaneously;
if the second application data is to be transmitted simultaneously, calculating the plurality of transmission rate combinations for simultaneously transmitting the first application data and the second application data based on the rules to calculate a transmission rate combination table, or generating the transmission rate combination table according to a pre-stored transmission rate combination table in the storage medium;
choosing a selected transmission rate combination from the plurality of transmission rate combinations in the transmission rate combination table based on a transmission rate requirement of the second application data; and
simultaneously transmitting the first application data and the second application data to the same receiver based on the selected transmission rate combination.

2. The transmitter as claimed in claim 1, wherein the selected transmission rate combination comprises a first modulation scheme and a first encoding rate for transmitting the first application data and a second modulation scheme and a second encoding rate for transmitting the second application data.

3. The transmitter as claimed in claim 2, further comprising:
a first channel encoder, coupled to the processor and receiving the first application data, wherein the first channel encoder is controlled by the processor to encode the first application data based on the first encoding rate;
a first modulator, coupled to the processor and the first channel encoder, wherein the first modulator is controlled by the processor to modulate the encoded first application data based on the first modulation scheme;
a second channel encoder, coupled to the processor and receiving the second application data, wherein the second channel encoder is controlled by the processor to encode the second application data based on the second encoding rate;
a second modulator, coupled to the processor and the second channel encoder, wherein the second modulator is controlled by the processor to modulate the encoded second application data based on the second modulation scheme; and
an antenna, coupled to the first modulator and the second modulator and transmitting the first application data and second application data that are encoded and modulated to the receiver.

4. The transmitter as claimed in claim 3, wherein the processor further receives configuration information comprising a transmission rate combination table size and the total encoding rate from the receiver through the antenna, and calculates the plurality of transmission rate combinations based on the transmission rate combination table size and the total encoding rate.

5. The transmitter claimed in claim 4, wherein the processor further calculates the first encoding rate and the second encoding rate based on the total encoding rate and a power ratio corresponding to the selected transmission rate combination.

6. The transmitter as claimed in claim 4, wherein the configuration information further comprises a backoff instruction, and the processor further subtracts a first differential value and a second differential value respectively from the first encoding rate and the second encoding rate obtained through calculation based on the backoff instruction or multiplies the first encoding rate and the second encoding rate obtained through calculation respectively by a first ratio and a second ratio based on the backoff instruction, so as to lower the first encoding rate for transmitting the first application data and the second encoding rate for transmitting the second application data.

7. The transmitter as claimed in claim 4, wherein the configuration information further comprises a combination table subset index, and the processor further chooses a subset of the transmission rate combination table as a new transmission rate combination table based on the combination table subset index.

8. The transmitter as claimed in claim 4, wherein the processor further calculates the transmission rate combination table based on a type of the receiver.

9. The transmitter as claimed in claim 1, wherein the processor further calculates transmission rates of the respective transmission rate combinations for transmitting the second application data and compares the calculated transmission rates with the transmission rate requirement of the second application data to choose a transmission rate combination whose transmission rate is closest to the transmission rate requirement as the selected transmission rate combination from at least one of the plurality of transmission rate combinations that satisfies the transmission rate requirement.

10. The transmitter as claimed in claim 1, wherein the processor further executes the following:
transmitting the first application data based on an initial transmission rate combination if it is determined not to transmit the second application data.

11. A transmission method performed by a user equipment (UE) for a non-orthogonal multiple access (NOMA) communication system, the method comprising:
storing a plurality of rules for calculating a plurality of transmission rate combinations for simultaneously transmitting a first application data and a second application data, wherein the plurality of rules are associated with a total encoding rate, a power ratio of a transmission power corresponding to the first application data to a transmission power corresponding to the second application data, a modulation scheme for the first application data, and a modulation scheme for the second application data;

receiving a transmission grant for transmitting the first application data from a receiver;

determining whether to transmit the second application data simultaneously;

if the second application data is to be transmitted simultaneously, calculating the plurality of transmission rate combinations for simultaneously transmitting the first application data and the second application data based on the rules to calculate a transmission rate combination table, or generating the transmission rate combination table according to a pre-stored transmission rate combination table;

choosing a selected transmission rate combination from the plurality of transmission rate combinations in the transmission rate combination table based on a transmission rate requirement of the second application data; and simultaneously transmitting the first application data and the second application data to the same receiver based on the selected transmission rate combination.

12. The transmission method as claimed in claim 11, wherein the selected transmission rate combination comprises a first modulation scheme and a first encoding rate for transmitting the first application data and a second modulation scheme and a second encoding rate for transmitting the second application data.

13. The transmission method as claimed in claim 12, further comprising:

encoding the first application data based on the first encoding rate;

modulating the encoded first application data based on the first modulation scheme;

encoding the second application data based on the second encoding rate;

modulating the encoded second application data based on the second modulation scheme; and transmitting the first application data and the second application data that are encoded and modulated to the receiver.

14. The transmission method as claimed in claim 13, further comprising:

receiving configuration information comprising a transmission rate combination table size and the total encoding rate from the receiver; and calculating the plurality of transmission rate combinations based on the transmission rate combination table size and the total encoding rate.

15. The transmission method as claimed in claim 14, further comprising:

calculating the first encoding rate and the second encoding rate based on the total encoding rate and a power ratio corresponding to the selected transmission rate combination.

16. The transmission method as claimed in claim 14, wherein the configuration information further comprises a backoff instruction, and the transmission method further comprises:

subtracting a first differential value and a second differential value respectively from the first encoding rate and the second encoding rate obtained through calculation based on the backoff instruction, or multiplying the first encoding rate and the second encoding rate obtained through calculation respectively by a first ratio and a second ratio based on the backoff instruction, so as to lower the first encoding rate for transmitting the first application data and the second encoding rate for transmitting the second application data.

17. The transmission method as claimed in claim 14, wherein the configuration information further comprises a combination table subset index, and the transmission method further comprises:

choosing a subset of the transmission rate combination table as a new transmission rate combination table based on the combination table subset index.

18. The transmission method as claimed in claim 14, further comprising:

calculating the transmission rate combination table based on a type of the receiver.

19. The transmission method as claimed in claim 11, further comprising:

calculating transmission rates of the respective transmission rate combinations for transmitting the second application data and comparing the calculated transmission rates with the transmission rate requirement of the second application data to choose a transmission rate combination whose transmission rate is closest to the transmission rate requirement as the selected transmission rate combination from at least one of the plurality of transmission rate combinations that satisfies the transmission rate requirement.

20. The transmission method as claimed in claim 11, further comprising:

transmitting the first application data based on an initial transmission rate combination if it is determined not to transmit he second application data.

* * * * *